United States Patent [19]

Hoffmann

[11] Patent Number: 4,561,458
[45] Date of Patent: Dec. 31, 1985

[54] STEAM-METERING METHOD AND APPARATUS

[75] Inventor: Rudolf H. Hoffmann, Warwick, N.Y.

[73] Assignee: Spence Engineering Company, Walden, N.Y.

[21] Appl. No.: 673,022

[22] Filed: Nov. 19, 1984

[51] Int. Cl.⁴ .............................................. G05D 7/06
[52] U.S. Cl. ........................................ 137/2; 137/110
[58] Field of Search ............................ 137/2, 14, 110

[56] References Cited

U.S. PATENT DOCUMENTS

| | | | |
|---|---|---|---|
| 1,503,591 | 8/1924 | Kerr | 137/110 |
| 2,949,125 | 8/1960 | Gilmore | 137/110 X |
| 3,169,047 | 2/1965 | Osburn | 137/110 X |

Primary Examiner—Alan Cohan
Attorney, Agent, or Firm—Hopgood, Calimafde, Kalil, Blaustein & Judlowe

[57] ABSTRACT

A steam or the like supply system has two parallel legs of supply, a first leg designed for high-demand flows and for the metering thereof, and a second leg designed for low-demand flows and for the metering thereof. Each of these legs has its own control valve, and an electronic controller responds to a sensed drop in demand to control a program of valve in the low-demand line; similarly, the controller responds to a sensed increase in demand to control a program of valve shut down in the low-demand leg while opening the control valve in the high-demand line. Protective features in the controller assure against response to transient changes in demand and against interruption of a valve-changing operation until the programmed change has been fully implemented.

14 Claims, 3 Drawing Figures

STEAM-METERING METHOD AND APPARATUS

BACKGROUND OF THE INVENTION

The invention relates to the metering of flows of steam to steam consumers, particularly in the circumstance wherein there are large changes in demand over the course of time.

Steam-supply facilities suffer adverse economic consequence from the fact that the steam-metering system for each customer has a limited range of flowmeasuring capability, selected for optimum efficiency for the predominant range of demand for the particular customer. This being the case, the flow-measuring capability is inadequate to respond to a low-demand situation, with the result that much of the customer's use of low-demand steam is not metered and therefore cannot be billed. To a degree, the same metering deficiency applies to overload-demand situations which are beyond the efficient metering range of the system.

It has been proposed to meet the problem of limited-demand flow-measuring capability by employing two separate supply lines in parallel to each customer, one of the lines having its control valve and flow-measuring means to provide optimized metering for a normal or high rate of flow, for periods of high demand, and the other line being similarly equipped but providing optimized metering for the low-demand situation, the supply connection to the customer being via one or the other of these lines. Such systems have been less than satisfactory for various reasons, including (1) an inability to transfer smoothly from use of one supply line to use of the other, and (2) undue response to transient changes in demand. And although the different approaches of Pegrum U.S. Pat. No. 3,164,726, Cramer U.S. Pat. No. 3,612,500 and Kruto U.S. Pat. No. 4,425,930 deal with problems of extended-range response in other arts, none of them is suggestive of a solution for the above-indicated metering problem for the commercial steam supplier.

BRIEF STATEMENT OF THE INVENTION

It is an object of the invention to provide an improved method and apparatus for the efficient metering of steam during periods of low demand as well as during periods of normal or high demand.

A specific object is to meet the above object by effecting controlled transfer from one supply line to the other, without susceptibility to transient changes in demand, either as the cause of an initiated transfer or as an interruption of the progress of effecting a given transfer operation.

The invention achieves these objects by delaying the initiation of a given line-transfer control operation for a predetermined interval of sustained change of demand, by initiating a line-transfer control operation only after the predetermined interval has run, and by effecting the transfer control by predetermined progressive change in the actuation of control valves in the respective lines, control-valve opening being relatively slow and control-valve closure being relatively fast. Once initiated, a given line-transfer control operation is caused to proceed to completion, regardless of any transient change in demand; and a succeeding line-transfer control operation cannot be initiated until both control valves, i.e., in the low-demand line and in the high-demand line, have completed their respective programs to full-open or to full-closed position, as the case may be.

DETAILED DESCRIPTION

A preferred embodiment of the invention will be illustratively described in detail, in conjunction with the accompanying drawings, in which.

Figure 1:
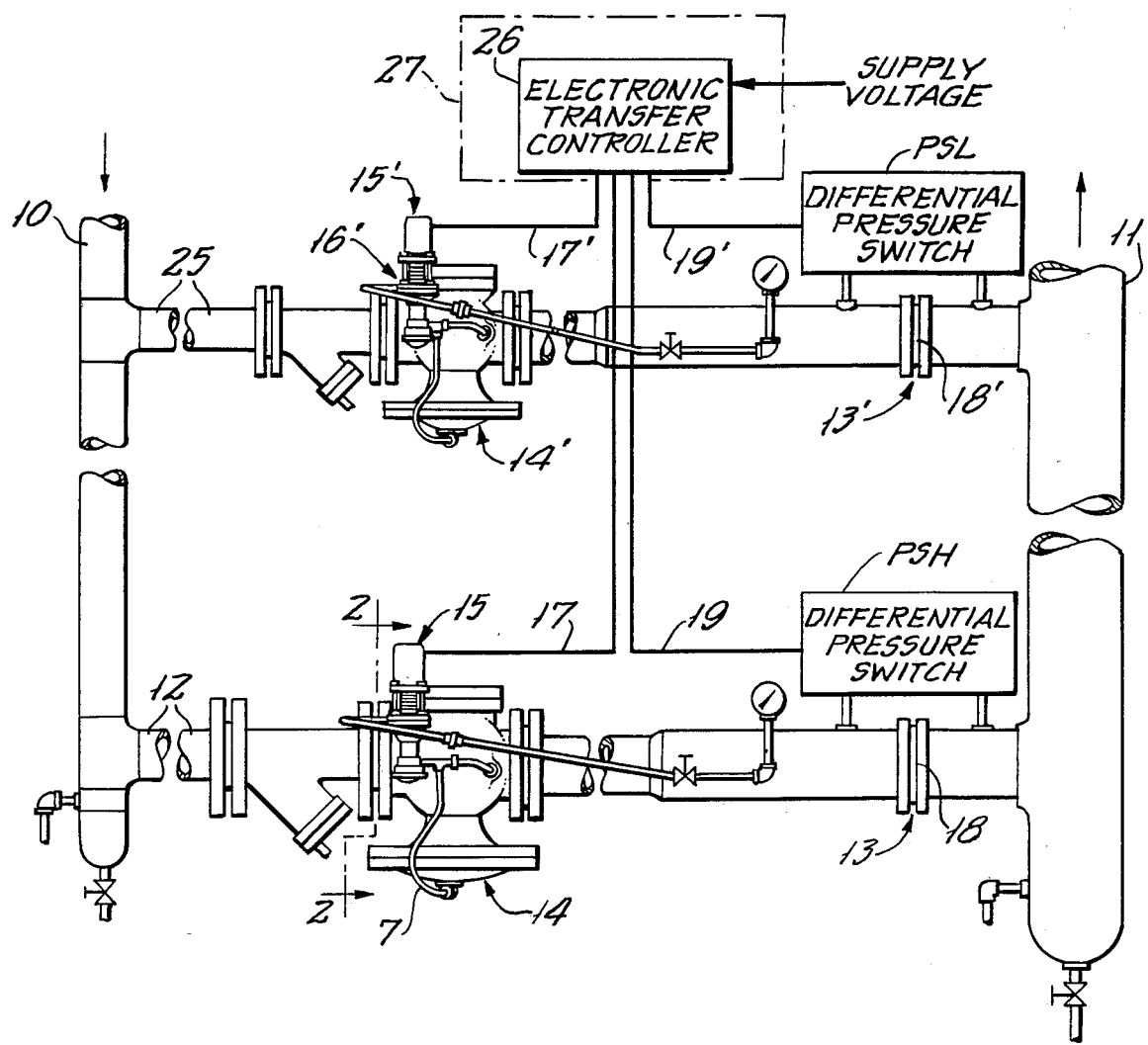
FIG. 1 is a diagram showing components of a flow measuring system of the invention.
Figure 2:
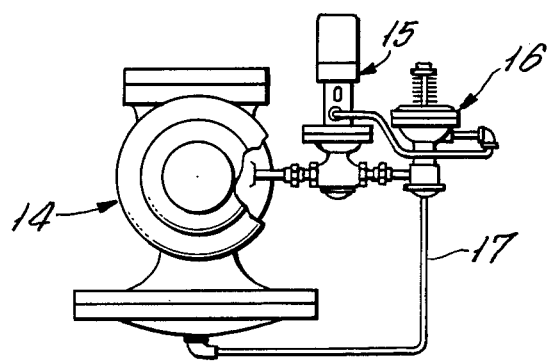
FIG. 2 is a side view of one of the control-valve arrangements of FIG. 1, being as seen from the line 2—2 of FIG. 1.

In FIGS. 1 and 2, the invention is shown in application to the metering of steam supplied via an inlet line 10 (as from a commercial supplier of steam for industrial or the like use) to a delivery line 11 to an industrial or the like customer for the steam. Depending upon the customer's requirements, there will be at least one important phase of a day's operations in which the customer's demand for steam will be in a high-demand category, best served via a first or high-demand line 12 and its flow-measuring means 13, connecting the inlet and delivery lines 10–11. The high-demand line 12 is shown to include a main control valve 14 with an electrically operated pilot 15 and a pressure-regulating pilot 16 whereby an electrical-signal program supplied via means 17 to the electrical input connection of pilot 15 may establish a predetermined succession of control pressures in a control line 18 to valve 14; depending upon the particular electrical-signal program, valve 14 may be thus caused to proceed through a succession of progressive opening positions of its valve member, from fully closed position to full-open, or through a similar succession of valve-member positions, from full-open position to fully closed. A description of such control of main valve 14 may be found in U.S. Pat. No. 3,536,093 and, therefore, need not now be further described, except that a preference is indicated for a Type-E diaphragm-operated valve at 14, for a Type-D208 electrically operated pilot at 15, and for a Type-D diaphragm-operated pressure pilot at 16, all being valve types available from Spence Engineering Company, Walden, N.Y.

Instantaneous flow in the high-demand line is continuously measured at 13 for metering purposes. In the form shown, a differential-pressure switch PSH is connected for response to the drop in pressure across an orifice plate 18 in line 12; for a purpose to be later explained, switch PSH is normally closed, being open throughout a predetermined range of "high-demand" flow rates, and closing whenever steam flow drops to and below a predetermined low-flow limit of metering in line 12.

A second or low-demand line 25 interconnects the inlet and delivery lines 10–11, in shunt with respect to line 12 and its control and metering components. The low-demand line 25 very much duplicates line 12 and its components, except that the capacity of line 25 is of reduced proportions, appropriate to the lower-demand flows it is to serve. Thus, in line 25 the main control valve 14' may, except for size, be the functional equivalent of valve 14 in line 12, and the control pilots 15'–16' in line 25 may be duplicates of their counterparts 15–16 in line 12. Flow-measuring means 13' is also provided in line 25, and for this purpose a suitable orifice plate 18' and differential-pressure switch PSL are shown. For a purpose to be made clear, switch PSL is of the normally open variety, being set to close at achievement of a predetermined upper limit of detected pressure difference, identifying the upper limit of steam-flow metering for flow in the low-demand line 25. Preferably, the closure setting of switch PSL is at an upper limit of low-demand flow (in line 25) which at least to a small extent overlaps the lower limit of high-demand flow (in line 12), namely the lower limit at which switch PSH in line 12 returns to its normally closed position following a period of high-demand steam supply and metering.

In FIG. 1, an electronic transfer controller 26 is shown with separate sensing-input connections 19-19' which reflect the instantaneous open or closed condition of the respective differential-pressure switches PSH and PSL. Controller 26 is also shown with valve-controlling output connections 17-17' for delivery of a valve-opening control signal in one of these connections while delivering a valve-closing control signal in the other of these connections, depending upon whether steam flow to the customer is to be transferred from the high-demand line 12 to the low-demand line 25, or vice versa, all in accordance with the particular change of state of one of the switches PSH and PSL. Controller 26 may be a component of metering means 27 which may separately report steam consumption in the respective lines 12–25, or which may provide a single display of total consumption, through automatic summation of the separate time integrations of measured flow in the respective lines 12–25.

Figure 3:
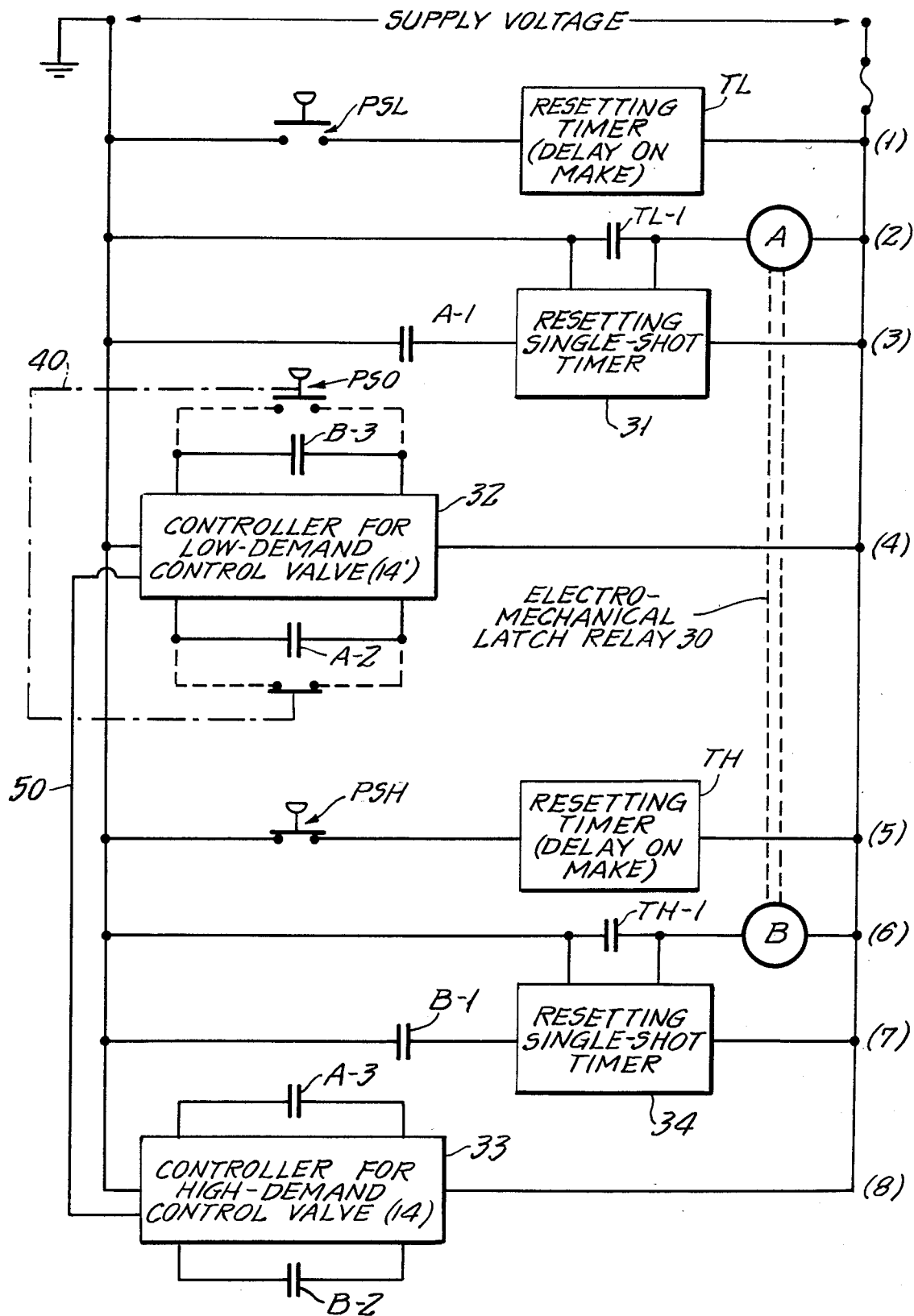
FIG. 3 is a ladder-type control-circuit diagram for the system of FIGS. 1 and 2.

The circuitry of FIG. 3 automatically implements transfer of steam flow via the low-demand line 25 to the high-demand line 12 when low-flow demand rises to the point where switch PSL closes and thus indicates to controller 26 that flow metering can be accomplished with sufficient accuracy in the metering system of the high-demand line. The circuitry of FIG. 3 also automatically implements transfer of steam flow via the high-demand line 12 to the low-demand line 25 when high-flow demand drops to the point where switch PSH closes and thus indicates to controller 26 that flow metering can be more reliably accomplished in the metering system of the low-demand line. To arrive at either one of these line utilizations from a cold start, it will be understood that some of the already described components are used; however, the operations and circuitry for a cold start, i.e., for the customer's start up from cold condition of its steam-utilization plant need not now be shown or described, in view of the coldstart descriptive emphasis in U.S. Pat. No. 3,536,093.

Thus, in describing the circuit of FIG. 3, it will be assumed that the customer has been using steam in the low-demand phase of metering wherein all steam flow has been from inlet 10 to delivery outlet 11 via the low-demand line 25, with valve 14' fully open and valve 14 fully closed. However, customer demand has been building and when the flow rate in line 25 reaches the predetermined upper limit, switch PSL closes to initiate the cycle of a delay timer TL, at level (1) of FIG. 3. Timer TL is of the resetting variety wherein, if for any reason its excitation is interrupted, it will reset and will not begin to start the timing of its predetermined interval, until the next closure of switch PSL. Suitably, a predetermined time delay of 30 seconds at timer TL, meaning 30 seconds of continuous delivery of steam in line 25 at or above the high-flow limit, signified by 30 seconds of continuous closure of switch PSL, is assurance that the increased demand is real and is not a transient. At completion of timing at TL, normally open timer contacts TL-1 close to complete an excitation circuit, at level (2) of FIG. 3, to a first coil A of an electro-mechanical latch relay 30, thereby closing normally open contacts A-1, A-2 and A-3 of the relay; at the same time, corresponding contacts B-1, B-2 and B-3 associated with relay (30) response to excitation of its second coil B are returned to the normally open condition. Closure of contacts A-1, A-2 and A-3, upon excitation of coil A, performs the following functions:

At level (3), contacts A-1 complete a circuit to a short-interval timer 31, of the resetting, single-shot variety, whereby the circuit to coil A is maintained a sufficient time to allow timer TL to reset, e.g., for 0.6 second.

At level (4), contacts A-2 initiate a program of electrical control signals at 32 to the low-demand control valve 14' (via line 17' and pilot 15' of FIG. 1), whereby a program of continuous closure of valve 14' is run to completion (full closure) over a predetermined relatively short period of time.

At level (8), contacts A-3 initiate a step program of electrical control signals at 33 to the high-demand control valve 14 (via line 17 and pilot 15 of FIG. 1), whereby a program of stepped opening of valve 14 is run to completion (full opening) over a predetermined relatively long period of time.

Each of the devices at 32 and 33 may illustratively be understood to be an electronic solid-state time controller, designed for pulsed driving of a bi-directional motor at the pilot 15 (15') with which it is connected via line 17 (17'). In the valve-opening cycle, each of these controllers will slowly open its associated valve 14 (14'), in a time period which can be pre-selected and at a rate which can be adjusted; in the valve-closing cycle, each of these controllers sends continuous current to the pilot motor at 15 (15'), thereby driving the same in the direction to close valve 14 (14') at full rated motor speed. Thus, for the case of coil-A excitation to transfer steam delivery to the high-demand line, controller 32 closes valve 14' in a relatively short period of time while controller 33 opens valve 14 in a stepped and longer period of time that is appropriate for the safe and quiet building of steam flow, to the point of demand satisfaction. Both controllers will also be understood to include hold-in means whereby, once started in a program of valve-opening control, such program will continue to completion while precluding initiation of a different controller program.

As long as demand remains in the range of the high-demand line 12, i.e., for steam flows which are adequate to keep switch PSH open, the high-demand line 12 will be the sole avenue of steam delivery and metering. However, when demand drops to the point of allowing switch PSH to return to its normally closed condition (and for a period of delay time, such as a continuous 30 seconds, assured by a resetting timer TH at level (5)), coil B of the latch relay is excited, to close its associated contacts B-1, B-2 and B-3, while returning all A-coil contacts A-1, A-2 and A-3 to their normally open condition. Closure of contacts B-1, B-2 and B-3, upon excitation of coil B, performs the following functions:

At level (7), contacts B-1 complete a circuit to a short-interval timer 34, analogous to timer 31, whereby the circuit to coil B is maintained a sufficient time to allow timer TH to reset.

At level (8), contacts B-2 initiate a shut-down program of electrical-control signals at 33 to the high-demand valve 14 (via line 17 and pilot 15 of FIG. 1), whereby a program of continuous closure of valve 14 is run to completion (full closure) over a predetermined relatively short period of time.

At level (4), contacts B-3 initiate a step program of electrical control signals at 32 to the low-demand control valve 14' (via line 17' and pilot 15' of FIG. 1), whereby a program of stepped opening of valve 14' is run to completion (full opening) over a predetermined and relatively long period of time.

Use of the low-demand line (25) alone will remain for as long as switch PSL is not closed for a 30-second interval, meaning that high-limit pressure across orifice 18' in line 25 has not been sufficiently continuous to survive the delay protection afforded by the resetting timer TL. However, once this delay requirement is met on a rising demand, the described cycle of events will repeat.

For simplicity of description, components of FIG. 3 have not been shown in detail, in that they are commercially available items. For example, each of the timers TL and TH may be a Crouzet Model 88-256-510 motor-driven timer. Each of the single-shot timers 31-34 may be an Infitec Model BSR-5. And the latching relay 30 may be a Potter and Brumfield Model KBP-11AG. Further, an interlock connection 50 between controllers 32-33 will be understood to be suggestive of means associated with hold-in relays of both controllers to assure completion of both the valve opening in one line and the valve closing in the other line before any further control-reversing program can be initiated.

The described apparatus and the technique which it implements will be seen to meet all stated objects, enabling steam consumption to be correctly metered for each of two adjacent regions of efficient metering. The actual flow-measuring and metering devices for high-demand flows in line 12 and for low-demand flows in line 25 are not shown or described because they may be conventional, and they may be included in the same cabinet or housing in which the electronic transfer controller 26 is installed, all as suggested at 27. The designation 27 will thus be understood to suggest such metering means which, if operated via differential pressures across orifice plates 18 (18'), may use the same differential-pressure connections as those for operation of switches PSL and PSH; the metering aspect of such connections will be understood to have been omitted from FIG. 1 for purposes of simplicity.

While the invention has been shown and described for a particular preferred embodiment, it will be understood that modifications may be made without departing from the scope of the invention. For example, steam happens to be the fluid subject to delivery and metering in the described system; the fluid can be any gas or liquid and still use the principles of the invention. Also, by way of example, the invention is not to be considered limited to automated transfer as between one or the other of two supply lines, in that principles of the invention are applicable to use of a particular one of three or more parallel supply and metering lines, each sized for correct metering of a different fraction of the wider range of flow demand which all lines individually contribute to serve, each at its own fractional range of efficient operation.

Still further, it can be noted that the described circuit of FIG. 3 can be made to serve a limited extension of demand above the upper limit of efficient utilization of line 12 alone, by automatically bringing line 25 on-line, so that the metering in line 25 can be added to metering in line 12, for a correct measure of consumption in an "overload" situation. This is simply and schematically suggested in FIG. 3 by an additional switch PSO having normally open contacts which, when closed, bridge the contacts B-3 at level (4) for initiating an opening of valve 14' while valve 14 remains open; switch PSO may be tapped in parallel to the connections of switch PSH across orifice plate 18, but set to close its normally open contacts upon detection of flow at the upper end of the metering range of line 12. It will be understood that switch PSO may include additional normally closed contacts which, in response to a drop of demand to a level which can be satisfied by line 12 alone, will close in bridging relation with contacts A-2 at level (4) to initiate the program for closure of valve 14'; in FIG. 3, the mechanically interrelated functioning of the described normally open and normally closed contacts of switch PSO is suggested at 40.

What is claimed is:

1. In the method of metering the supply of steam over a wide range of demand involving a high-demand line and a low-demand line connected in parallel, wherein each line includes flow-metering means connected to a control valve to govern the transfer of flow to the low-demand line at the low end of the metering range of the high-demand line and to transfer flow to the high-demand line at the upper end of the range of the low-demand line, the improvement which comprises Step (1), delaying the control of any such transfer for a predetermined interval of sustained change in demand, whereby to avoid response to transient changes in demand;

Step (2), initiating the transfer control only after said predetermined interval has run, and Step (3), effecting the transfer control by predetermined relatively slow progressive change in at least a valve-opening actuation of said control valves, whereby to avoid rapid change in the flow of steam in the line to which flow is being transferred.

2. The improved method of claim 1, in which, once Step (3) has been initiated, it is irreversibly continued until completed.

3. The improved method of claim 1, in which, for overload demand that is sensed at the upper end of the high-demand line, the control valve of the low-demand line is opened, whereby the sum of metering in both lines is the measure of total consumption under an overload condition.

4. The improved method of claim 1, in which Step (3) is performed for one control valve concurrently with relatively rapid closure of the other control valve.

5. In the method of metering the supply of a fluid over a wide range of demand involving a high-demand line and a low-demand line connected in parallel, wherein each line includes flow-metering means connected to a control valve to govern the transfer of flow to the low-demand line at the low end of the metering range of the high-demand line and to transfer flow to the high-demand line at the upper end of the range of the low-demand line, the improvement which comprises Step (1), delaying the control of any such transfer for a predetermined interval of sustained change in demand, whereby to avoid response to transient changes in demand;

Step (2), initiating only after said predetermined interval has run, and

Step (3), effecting the transfer control by predetermined relatively slow progressive change in at least a valve-opening actuation of said control valves, whereby to avoid rapid change in fluid flow in the line to which flow is being transferred.

6. The improved method of claim 5, in which the fluid is steam.

7. In a steam-flow measuring system comprising a high-demand line and a low-demand line connected in parallel between a supply-receiving inlet and a supply-delivering output, a motor-operated flow-control valve and a metering orifice in each of said lines, first and second differential-pressure switches connected across the respective orifices, the first of said differential-pressure switches being operative to change its state upon detection of steam flow at the upper end of the metering range of the low-demand line and the second of said differential-pressure switches being operative to change its state upon detection of steam flow at the lower end of the metering range of the high-demand line, a first resetting delay-timing switch connected for operation by said first differential-pressure switch for timing a first predetermined interval to avoid valve response to a steam-flow transient condition, first controller means responsive to completion of a timed delay by said first delay-timing switch and establishing a valve-opening motor-drive connection to the motor-operated control valve of the high-demand line, and second controller means concurrently responsive to completion of said first interval and establishing a valve-closing motor-drive connection to the motor-operated control valve of the low-demand line, a second resetting delay-timing switch connected for operation by said second differential-pressure switch for timing a second predetermined interval to avoid valve response to a steam-flow transient condition, said first controller means being responsive to completion of a second interval by said second delay-timing switch and establishing a valve-closing motor-drive connection to the motor-operated control valve of the high-demand line, and said second controller means being responsive to completion of said second interval and establishing a valve-opening motor-drive connection to the motor-operated control valve of the low-demand line.

8. The steam-flow measuring system of claim 7, in which said first and second controllers include means whereby a given operation thereof, once started, continues to completion of said given operation for each of said controllers.

9. The steam-flow measuring system of claim 7, in which each of said controllers is of a variety providing stepped increments of valve-positioning control at least for the valve-opening direction of control.

10. In a steam-flow measuring system comprising a high-demand line and a low-demand line connected in parallel between a supply-receiving inlet and a supply-delivering output, a motor-operated flow-control valve and a metering orifice in each of said lines, first and second differential-pressure switches connected across the respective orifices, the first of said differential-pressure switches being operative to change its state upon detection of steam flow at the upper end of the metering range of the low-demand line and the second of said differential-pressure switches being operative to change its state upon detection of steam flow at the lower end of the metering range of the high-demand line, relay means having a first state wherein the flow-control valve motor for one of said lines is connected for a valve-opening run while the flow-control motor in the other of said lines is connected for a valve-closing run, said relay means having a second state wherein the flow-control valve motor for the other of said lines is connected for a valve-opening run while the flow-control motor in said one line is connected for a valve-closing run, and delay means interposed in the connection of one of said switches to operate said relay to said first state and in the connection of the other of said switches to operate said relay to said second state.

11. The steam-flow measuring system of claim 10, in which hold-in means associated with both flow-control valve motors maintains the valve actuating drive of the involved motor until completion of the involved valve stroke, said hold-in means being interlocked to preclude any change of valve motor drive until both motors have completed their strokes.

12. The steam-flow measuring system of claim 7, and including flow-responsive switch means set to change its state at the upper end of the metering range of the high-demand line, said last-mentioned switch means being connected to said first controller to establish a valve-opening motor-drive connection to the motor-operated control of the low-demand line upon a rise in demand beyond said upper end for the high-demand line, and said last-mentioned switch means being also connected to said first controller to establish a valve-closing motor-drive connection to the motor-operated control of the low-demand line upon a drop in demand below said upper end for the high-demand line.

13. In a fluid-flow measuring system comprising a high-demand line and a low-demand line connected in parallel between a supply-receiving inlet and a supply-delivering output, a motor-operated flow-control valve and a flow-measuring device in each of said lines, the first of said flow-measuring devices being operative to produce an electrical change of state upon detection of fluid flow at the upper end of the metering range of the low-demand line and the second of said flow-measuring devices being operative to produce an electrical change of state upon detection of fluid flow at the lower end of the metering range of the high-demand line, relay means having a first state wherein the flow-control valve motor for one of said lines is connected for a valve-opening run while the flow-control motor in the other of said lines is connected for a valve-closing run, said relay means having a second state wherein the flow-control valve motor for the other of said lines is connected for a valve-opening run while the flow-control motor in said one line is connected for a valve-closing run, and delay means interposed in the connection of one of said flow-measuring devices to operate said relay to said first state and in the connection of the other of said flow-measuring devices to operate said relay to said second state.

14. In a fluid-flow measuring system comprising a high-demand line and a low-demand line connected in parallel between a supply-receiving inlet and a supply-delivering output, a motor-operated flow-control valve and a flow-measuring device in each of said lines, the first of said flow-measuring devices being operative to produce an electrical change of state upon detection of fluid flow at the upper end of the metering range of the low-demand line and the second of said flow-measuring devices being operative to produce an electrical change of state upon detection of fluid flow at the lower end of the metering range of the high-demand line, first resetting delay-timing means connected for operation by said first flow-measuring device for timing a first predetermined interval to avoid valve response to a fluid-flow transient condition, first controller means responsive to completion of a timed delay by said first delay-timing means and establishing a valve-opening motor-drive connection to the motor-operated control valve of the high-demand line, and second controller means concurrently responsive to completion of said first interval and establishing a valve-closing motor-drive connection to the motor-operated control valve of the low-demand line, second resetting delay-timing means connected for operation by said second flow-measuring means for timing a second predetermined interval to avoid valve response to a fluid-flow transient condition, said first controller means being responsive to completion of a second interval by said second delay-timing means and establishing a valve-closing motor-drive connection to the motor-operated control valve of the high-demand line, and said second controller means being responsive to completion of said second interval and establishing a valve-opening motor-drive connection to the motor-operated control valve of the low-demand line.

* * * * *